H. R. LADD & Z. C. PARKER.
FETTERS TO PREVENT COWS AND HORSES KICKING.
No. 193,968. Patented Aug. 7, 1877.
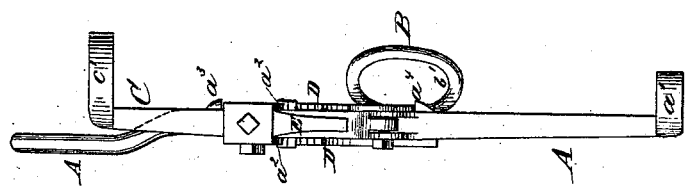
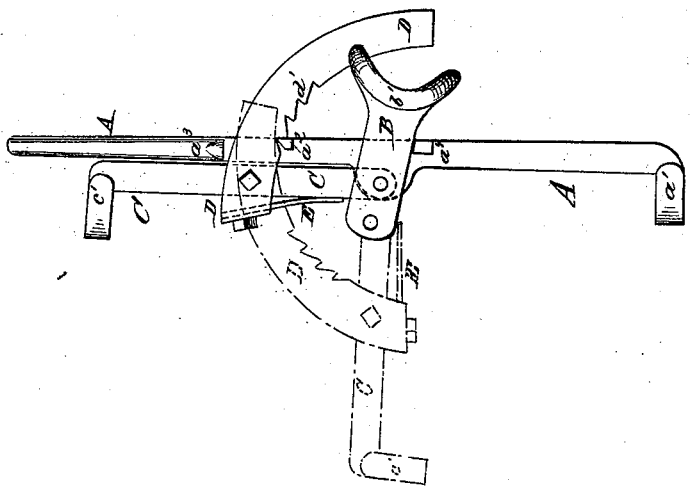

UNITED STATES PATENT OFFICE.

HENRY R. LADD AND ZERA C. PARKER, OF ORWELL, OHIO.

IMPROVEMENT IN FETTERS TO PREVENT COWS AND HORSES KICKING.

Specification forming part of Letters Patent No. 193,968, dated August 7, 1877; application filed May 5, 1877.

*To all whom it may concern:*

Be it known that we, HENRY REEVES LADD and ZERA COOK PARKER, of Orwell, in the county of Ashtabula and State of Ohio, have invented a new and useful Improvement in Anti-Kicking Fetters, of which the following is a specification:

Figure 1 is an inner side view of our improved device. Fig. 2 is a front edge view of the same.

Similar letters of reference indicate corresponding parts.

The object of this invention is to furnish an improved device for attachment to the legs of cows to prevent them from kicking while being milked, and to the legs of horses, to prevent them from kicking while being curried and otherwise handled, which shall be simple in construction, easily applied and detached, and effective in use.

The invention consists in an improved fetter, formed by the combination of the lever, having a hook formed upon its lower end and provided with projections, the pivoted bar having a hook formed upon its rear end, the pivoted bar having a hook formed upon its upper end, and the pivoted catch-bar provided with the teeth, and the spring, with each other, as hereinafter fully described.

A is a lever, upon the lower end of which is formed an inwardly-curved hook, $a^1$, to hook around the ankle of the animal. To a lug formed upon the forward side of the middle part of the lever A is pivoted a bar, B, which projects to the rearward, and has a wide hook, $b'$, formed upon its outer end. The middle part of the hook $b'$ is cut away to form a hole to receive the back of the animal's leg.

To the same pivot that pivots the bar B is pivoted the lower end of the bar C, which has an inwardly-curved hook, $c'$, formed upon its upper end, which is made large to hook upon the forward side of the upper part of the animal's leg. To the middle part of the bar C is pivoted the end of a curved catch or ratchet bar, D, which is slotted or bifurcated to receive the lever A, and has teeth $d'$ formed upon its lower or concave side, to catch upon a projection, $a^2$, formed upon the lever A.

The catch-bar D is kept in position upon the lever A by a projection, $a^3$, formed upon the said lever A above the said catch-bar D.

The hook-bar B is kept from dropping down upon the lever A by a projection, $a^4$, formed upon the said lever A below the said hook-bar B.

The catch-bar D is held down upon its stop $a^2$ by a spring, E, attached to its pivoted ends, and which bears against the forward side of the lever A.

In using the fetter the hook-bar C is turned down forward, as shown in dotted lines in Fig. 1, the hook $b'$ is placed over the animal's back, the upper end of the lever A is drawn forward, which brings the hook $a^1$ against the animal's ankle, and at the same time the bar C is raised, bringing the hook $c'$ against the forward side of the upper part of the animal's leg, the ratchet-bar D catching upon the projections $a^2$ and holding the device rigid.

This device prevents the animal from bending its leg, and thus prevents it from kicking, and a few applications will generally break it of the habit of kicking.

The device shown in the drawing is intended for the right leg, which is the only leg of a cow that needs to be fettered.

When applied to a horse, one of the devices should be applied to each hind leg.

Having thus described our invention, we claim as new and desire to secure by Letters Patent—

An improved fetter formed by the combination of the lever A, having a hook, $a^1$, formed upon its lower end, and provided with the projections $a^2$ $a^3$ $a^4$, the pivoted bar B, having a hook, $b^1$, formed upon its rear end, the pivoted bar C, having a hook, $c'$, formed upon its upper end, and the pivoted catch-bar D, provided with the teeth $d'$, and the spring E, with each other, substantially as herein shown and described.

HENRY R. LADD.
ZERA C. PARKER.

Witnesses:
E. P. GOODRICH,
R. E. STONE.